United States Patent
Sayyed et al.

(10) Patent No.: US 12,147,815 B2
(45) Date of Patent: Nov. 19, 2024

(54) SYSTEMS AND METHODS FOR PRE-OPERATING SYSTEM RETRIEVAL OF TELEMETRY IN A NO-POST/NO-VIDEO SCENARIO

(71) Applicant: Dell Products L.P., Round Rock, TX (US)

(72) Inventors: Ibrahim Sayyed, Georgetown, TX (US); Amit K. Tiwari, Austin, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/592,894

(22) Filed: Feb. 4, 2022

(65) Prior Publication Data
US 2023/0251867 A1 Aug. 10, 2023

(51) Int. Cl.
*G06F 9/44* (2018.01)
*G06F 9/4401* (2018.01)
*G06F 11/14* (2006.01)

(52) U.S. Cl.
CPC ........ *G06F 9/4403* (2013.01); *G06F 11/1417* (2013.01)

(58) Field of Classification Search
CPC .......................... G06F 9/4403; G06F 11/1417
USPC .................................................. 713/1, 2, 100
See application file for complete search history.

(56) References Cited

U.S. PATENT DOCUMENTS

| | | | | |
|---|---|---|---|---|
| 2010/0005286 A1* | 1/2010 | Wang | ................... | G06F 9/4406 717/174 |
| 2017/0052854 A1* | 2/2017 | Yang | ..................... | G06F 9/4401 |
| 2018/0165301 A1* | 6/2018 | Luo | ...................... | G06F 3/0665 |
| 2020/0341746 A1* | 10/2020 | Mehra | ................... | G06F 8/658 |

* cited by examiner

*Primary Examiner* — Michael J Brown
(74) *Attorney, Agent, or Firm* — .Jackson Walker L.L.P.

(57) ABSTRACT

An information handling system may include a processor, a memory communicatively coupled to the processor, a communications port communicatively coupled to the processor, and a basic input/output system (BIOS) comprising boot firmware configured to be executed by the processor of the information handling system when the information handling system is booted and/or powered on, and configured to initialize information handling resources of the information handling system and/or initialize interoperation of the information handling system with other information handling systems, the BIOS further configured to: responsive to a failure to complete a phase of execution of the BIOS, create a virtual disk on the memory such that the virtual disk is mountable as a volume by a second information handling system coupled to the information handling system via the communications port, and store telemetry information relevant to the failure to the virtual disk.

18 Claims, 2 Drawing Sheets

SYSTEMS AND METHODS FOR PRE-OPERATING SYSTEM RETRIEVAL OF TELEMETRY IN A NO-POST/NO-VIDEO SCENARIO

TECHNICAL FIELD

The present disclosure relates in general to information handling systems, and more particularly to methods and systems for pre-operating system retrieval of telemetry of an information handling system in a no power-on/self-test (POST)/no-video scenario.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A critical component of modern information handling systems is the BIOS. A BIOS may comprise boot firmware configured to be the first code executed by a processor of an information handling system when the information handling system is booted and/or powered on, and serves to initialize information handling resources of the information handling system and/or initialize interoperation of the information handling system with other information handling systems.

Users of an information handling system may experience a situation in which BIOS fails to complete power-on/self-test (POST) and fails to reach a point of execution in which video drivers of the information handling system execute, a situation often referred to as a no-POST/no-video situation. Diagnosis of the cause of a no-POST/no-video situation is often difficult, as diagnosis may rely on a user correctly observing diagnostic blink patterns of light-emitting diode indicators of the information handling system and correctly looking up the meaning of the numerical code associated with the blink patterns, which may lead to bad user experience as well as technical support requests to a vendor of the information handling system.

Often, using known approaches, when a no-POST/no-video situation occurs and built-in BIOS recovery is unable to recover, the solution is either a costly motherboard replacement or a reflash of new BIOS image to Serial Peripheral Interface (SPI) read-only memory (ROM) in which BIOS is stored, which may lead to loss of a user's persistent data.

SUMMARY

In accordance with the teachings of the present disclosure, the disadvantages and problems associated with diagnosis of pre-boot failures of an information handling system may be reduced or eliminated.

In accordance with embodiments of the present disclosure, an information handling system may include a processor, a memory communicatively coupled to the processor, a communications port communicatively coupled to the processor, and a basic input/output system (BIOS) comprising boot firmware configured to be executed by the processor of the information handling system when the information handling system is booted and/or powered on, and configured to initialize information handling resources of the information handling system and/or initialize interoperation of the information handling system with other information handling systems, the BIOS further configured to: responsive to a failure to complete a phase of execution of the BIOS, create a virtual disk on the memory such that the virtual disk is mountable as a volume by a second information handling system coupled to the information handling system via the communications port, and store telemetry information relevant to the failure to the virtual disk.

In accordance with these and other embodiments of the present disclosure, a method may include, by a basic input/output system (BIOS) of an information handling system, wherein the BIOS comprises boot firmware configured to be executed by the processor of an information handling system when the information handling system is booted and/or powered on, and configured to initialize information handling resources of the information handling system and/or initialize interoperation of the information handling system with other information handling systems: responsive to a failure to complete a phase of execution of the BIOS, creating a virtual disk on a memory of the information handling system such that the virtual disk is mountable as a volume by a second information handling system coupled to the information handling system via a communications port of the information handling system, and storing telemetry information relevant to the failure to the virtual disk.

In accordance with embodiments of the present disclosure, an article of manufacture may include a non-transitory computer-readable medium and computer-executable instructions carried on the computer-readable medium, the instructions readable by a processor, the instructions, when read and executed, for causing the processor to, in a basic input/output system (BIOS) of an information handling system: responsive to a failure to complete a phase of execution of the BIOS, create a virtual disk on a memory of the information handling system such that the virtual disk is mountable as a volume by a second information handling system coupled to the information handling system via a communications port of the information handling system, and store telemetry information relevant to the failure to the virtual disk.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
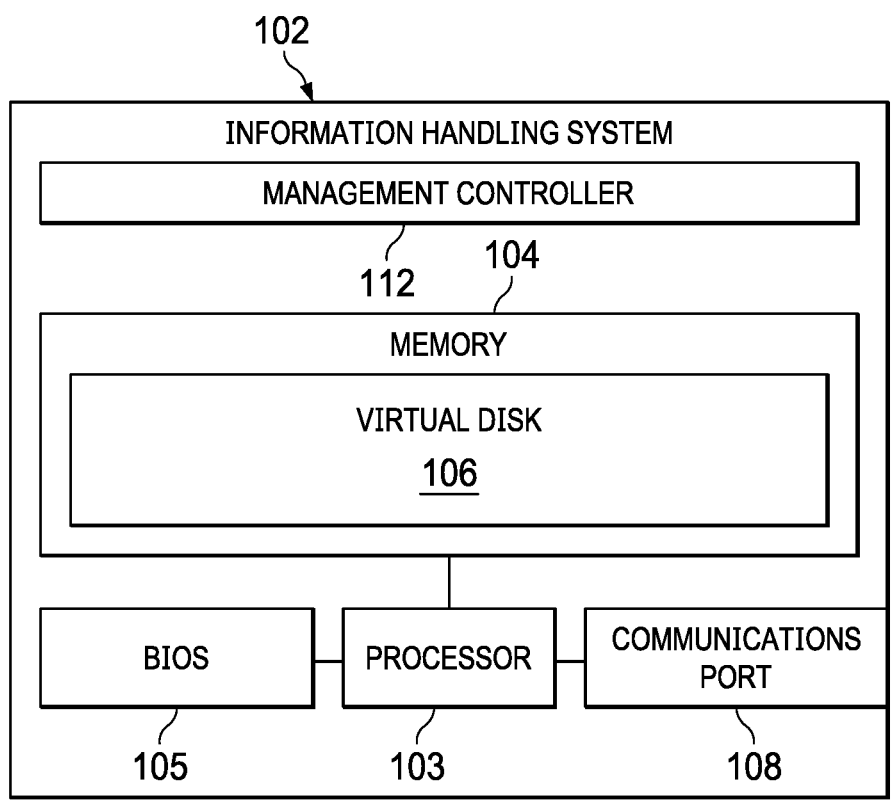
FIG. 1 illustrates a block diagram of an information handling system, in accordance with embodiments of the present disclosure.
Figure 2:
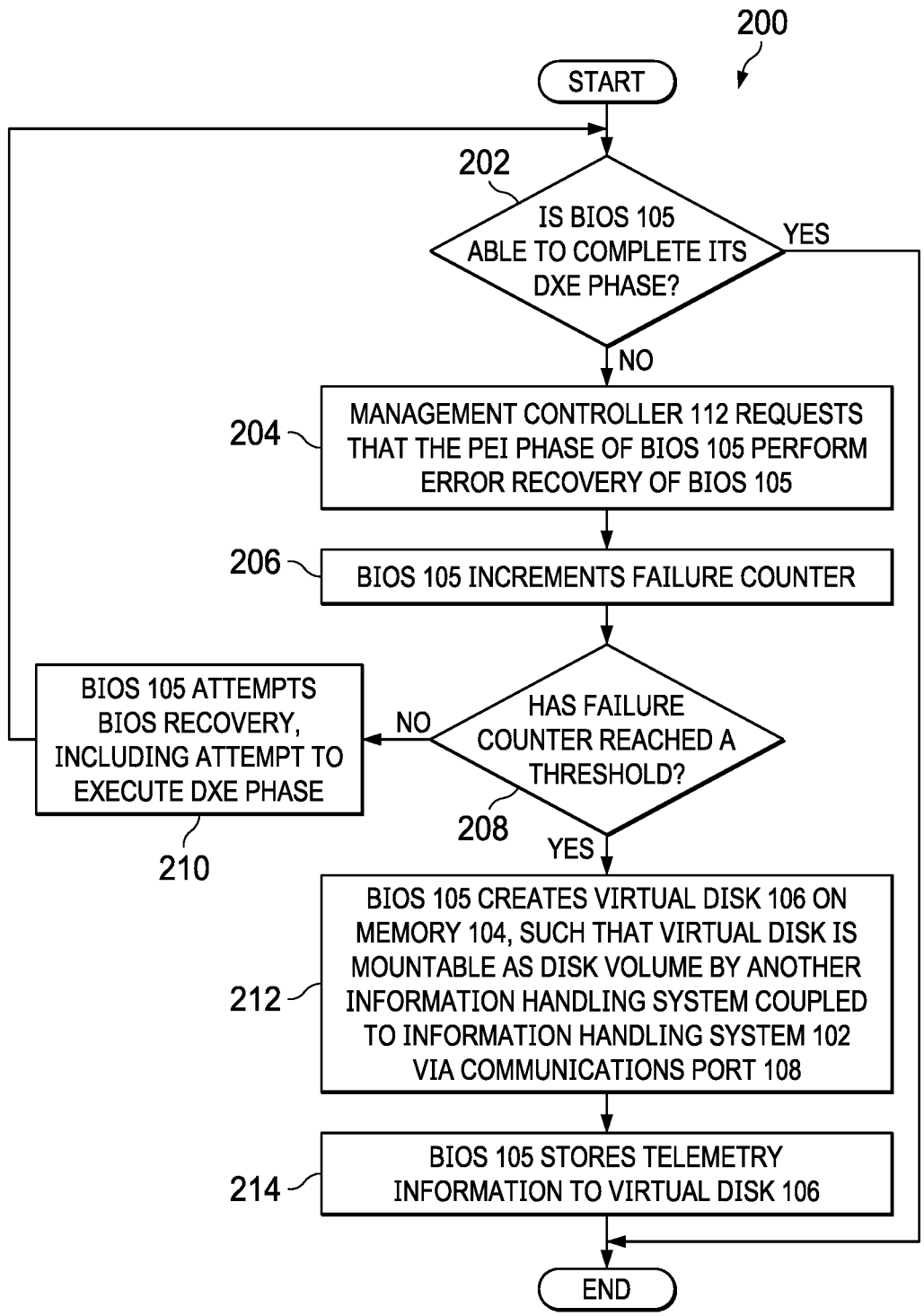
FIG. 2 illustrates a flowchart of an example method for pre-operating system retrieval of telemetry in a no-POST/no-video scenario, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, an information handling system 102 may comprise a personal computer. In some embodiments, an information handling system 102 may comprise or be an integral part of a server. In other embodiments, an information handling system 102 may comprise a portable information handling system (e.g., a laptop or notebook, etc.). As depicted in FIG. 1, an information handling system 102 may include a processor 103, a memory 104 communicatively coupled to processor 103, a BIOS 105 communicatively coupled to processor 103, a communications port 108 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have created thereon a virtual disk 106. As described in greater detail below, BIOS 105 may be configured to create virtual disk 106 on memory 104, for example as a RAMDISK FAT32 file system, such that virtual disk 106 may be readable as a mountable drive to another information handling system coupled to information handling system 102 via communications port 108.

BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. As described in greater detail below, in a no-POST/no-video scenario, BIOS 105 may create virtual disk 106 in memory 104.

Communications port 108 may serve as a communications interface between information handling system 102 and a peripheral device or another information handling system, which may be coupled to communications port 108 via a cable. Accordingly, communications port 108 may include a specialized outlet to which a plug or cable connects and may further include one or more electrical conductors where communications port 108 and cable contacts mate, providing for transfer of signals between information handling system 102 and a device coupled to communications port 108. Examples of communications port 108 may include a Universal Serial Bus port, a serial port, a parallel port, or any other suitable type of port.

Management controller 112 may be configured to provide out-of-band management facilities for management of information handling system 102. Such management may be made by management controller 112 even if information handling system 102 is powered off or powered to a standby state. Accordingly, in some embodiments, such management may be made through a dedicated management communications channel which may be physically and/or logically isolated from an "in-band" communications channel used by a host system of information handling system 102 when powered on. In certain embodiments, management controller 112 may include or may be an integral part of a baseboard management controller (BMC), a remote access controller (e.g., a Dell Remote Access Controller of Integrated Dell Remote Access Controller), or an enclosure controller. In other embodiments, management controller 112 may include or may be an integral part of a chassis management controller (CMC).

In addition to processor 103, memory 104, BIOS 105, communications port 108, and management controller 112, information handling system 102 may include one or more other information handling resources.

FIG. 2 illustrates a flowchart of an example method 200 for pre-operating system retrieval of telemetry in a no-POST/no-video scenario, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 112 may monitor execution of BIOS 105 to determine whether BIOS 105 is able to complete its Driver Execution Environment (DXE) phase. If BIOS 105 is able to complete the DXE phase, execution of BIOS 105 may complete through to boot of an operating system, and method 200 may end. Otherwise, if management controller 112 determines BIOS 105 is unable to complete the DXE phase, method 200 may proceed to step 204.

At step 204, management controller 112 may communicate to BIOS 105, executing in its Pre-Extensible Firmware Interface (EFI) Initialization (PEI) phase, a request that the PEI phase perform error recovery of BIOS 105.

At step 206, in response to the request, BIOS 105, executing in the PEI phase, may increment a failure counter, such failure counter indicating a number of failed attempts to complete POST. At step 208, BIOS 105 may determine if the failure counter has reached a threshold. If the failure counter has reached the threshold, method 200 may proceed to step 212. Otherwise, method 200 may proceed to step 210.

At step 210, BIOS 105, executing in the PEI phase, may attempt to perform BIOS recovery, and again attempt execution of the DXE phase. After completion of step 210, method 200 may proceed again to step 202.

At step 212, in response to the occurrence of the threshold amount of boot failures, BIOS 105, executing in the PEI phase, may create virtual disk 106 on memory 104, such that virtual disk 106 is mountable as a disk volume by another information handling system coupled to information handling system 102 via communications port 108. BIOS 105 may create virtual disk 106 in any suitable manner, including initializing memory 104 for creating a virtual file system, writing an appropriate file system header (e.g., FAT16 or FAT32 header) to memory 104 with appropriate device information, and reserving blocks of memory 104 for virtual disk 106.

At step 214, following creating of virtual disk 106, BIOS 105 may store telemetry information to virtual disk 106. Such telemetry information may include any information that may be useful to a technician to diagnose the pre-boot failure of information handling system 102, including without limitation a copy of the firmware image of BIOS 105, platform-generated pre-operating system telemetry data (e.g., Dell BIOS-IQ data), data logs, and/or recovery error codes generated during execution of BIOS 105 and/or in connection with attempts at BIOS recovery.

After completion of step 214, method 200 may end.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

Once telemetry data is stored in virtual disk 106, a technician may couple another information handling system to information handling system 102 via communications port 108, and mount virtual disk 106 as a volume on such other information handling system, allowing the technician to evaluate the telemetry information on virtual disk 106 in order to identify one or more causes of boot failure of information handling system 102.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a central processing unit (CPU);
a random access memory (RAM) communicatively coupled to the CPU;
a communications port communicatively coupled to the CPU; and
a basic input/output system (BIOS) comprising boot firmware configured to be executed by the CPU when the information handling system is booted and/or powered on, and configured to initialize information handling resources of the information handling system and/or initialize interoperation of the information handling system with other information handling systems, the BIOS further configured to:
responsive to a failure to complete a phase of execution of the BIOS, create a virtual disk on the RAM such that the virtual disk is mountable as a volume by a second information handling system coupled to the information handling system via the communications port; and
store telemetry information to the virtual disk wherein the telemetry information includes a firmware image of the BIOS and one or more recovery error codes.

2. The information handling system of claim 1, wherein the phase of execution of the BIOS comprises a Driver Execution Environment of the BIOS.

3. The information handling system of claim 1, wherein the BIOS is configured to create the virtual disk and store the telemetry information to the virtual disk during a Pre-Extensible Firmware Interface Initialization phase of the BIOS.

4. The information handling system of claim 1, wherein the BIOS is further configured to:
responsive to a failure to complete the phase of execution of the BIOS, attempt BIOS recovery of the BIOS; and
responsive to a number of failures of attempts of BIOS recovery equaling a threshold value, create the virtual disk and store the telemetry information.

5. The information handling system of claim 1, wherein the virtual disk comprises a FAT16 file system.

6. The information handling system of claim 1, wherein the virtual disk comprises a FAT32 file system.

7. A method comprising, by a basic input/output system (BIOS) of an information handling system, wherein the BIOS comprises boot firmware configured to be executed by a central processing unit (CPU) of an information handling system when the information handling system is booted and/or powered on, and configured to initialize information handling resources of the information handling system and/or initialize interoperation of the information handling system with other information handling systems:
responsive to a failure to complete a phase of execution of the BIOS, creating a virtual disk on a random access memory (RAM) of the information handling system, coupled to the CPU, such that the virtual disk is mountable as a volume by a second information handling system coupled to the information handling system via a communications port of the information handling system; and
storing telemetry information to the virtual disk wherein the telemetry information includes a firmware image of the BIOS and one or more recovery error codes.

8. The method of claim 7, wherein the phase of execution of the BIOS comprises a Driver Execution Environment of the BIOS.

9. The method of claim 7, further comprising creating the virtual disk and storing the telemetry information to the virtual disk during a Pre-Extensible Firmware Interface Initialization phase of the BIOS.

10. The method of claim 7, further comprising:
responsive to a failure to complete the phase of execution of the BIOS, attempting BIOS recovery of the BIOS; and
responsive to a number of failures of attempts of BIOS recovery equaling a threshold value, creating the virtual disk and storing the telemetry information.

11. The method of claim 7, wherein the virtual disk comprises a FAT16 file system.

12. The method of claim 7, wherein the virtual disk comprises a FAT32 file system.

13. An article of manufacture comprising:
a non-transitory computer-readable medium; and
computer-executable instructions carried on the computer-readable medium, the instructions readable by a central processing unit (CPU), the instructions, when read and executed, for causing the CPU to, in a basic input/output system (BIOS) of an information handling system:
 responsive to a failure to complete a phase of execution of the BIOS, create a virtual disk on a random access memory (RAM) of the information handling system, coupled to the CPU, such that the virtual disk is mountable as a volume by a second information handling system coupled to the information handling system via a communications port of the information handling system; and
 store telemetry information to the virtual disk wherein the telemetry information includes a firmware image of the BIOS and one or more recovery error codes.

14. The article of claim 13, wherein the phase of execution of the BIOS comprises a Driver Execution Environment of the BIOS.

15. The article of claim 13, the instructions for further causing the CPU to create the virtual disk and store the telemetry information to the virtual disk during a Pre-Extensible Firmware Interface Initialization phase of the BIOS.

16. The article of claim 13, the instructions for further causing the CPU to:
 responsive to a failure to complete the phase of execution of the BIOS, attempt BIOS recovery of the BIOS; and
 responsive to a number of failures of attempts of BIOS recovery equaling a threshold value, create the virtual disk and storing the telemetry information.

17. The article of claim 13, wherein the virtual disk comprises a FAT16 file system.

18. The article of claim 13, wherein the virtual disk comprises a FAT32 file system.

* * * * *